L. C. PRINDLE.

Card-Racks.

No. 5,211. Reissued Dec. 31, 1872.

WITNESSES:
F. F. Warner.
N. C. Ensley

INVENTOR:
L. Corydon Prindle

AM. PHOTO-LITHOGRAPHIC CO. N.Y. (OSBORNE'S PROCESS.)

UNITED STATES PATENT OFFICE.

L. CORYDON PRINDLE, OF CHICAGO, ILLINOIS.

IMPROVEMENT IN CARD-RACKS.

Specification forming part of Letters Patent No. 119,995, dated October 17, 1871; reissue No. 5,211, dated December 31, 1872.

*To all whom it may concern:*

Be it known that I, L. CORYDON PRINDLE, of Chicago, in the State of Illinois, have invented certain Improvements in Card-Racks, of which the following is an exact description, reference being had to the accompanying drawing which forms a part of this specification, and in which—

Figure 1:
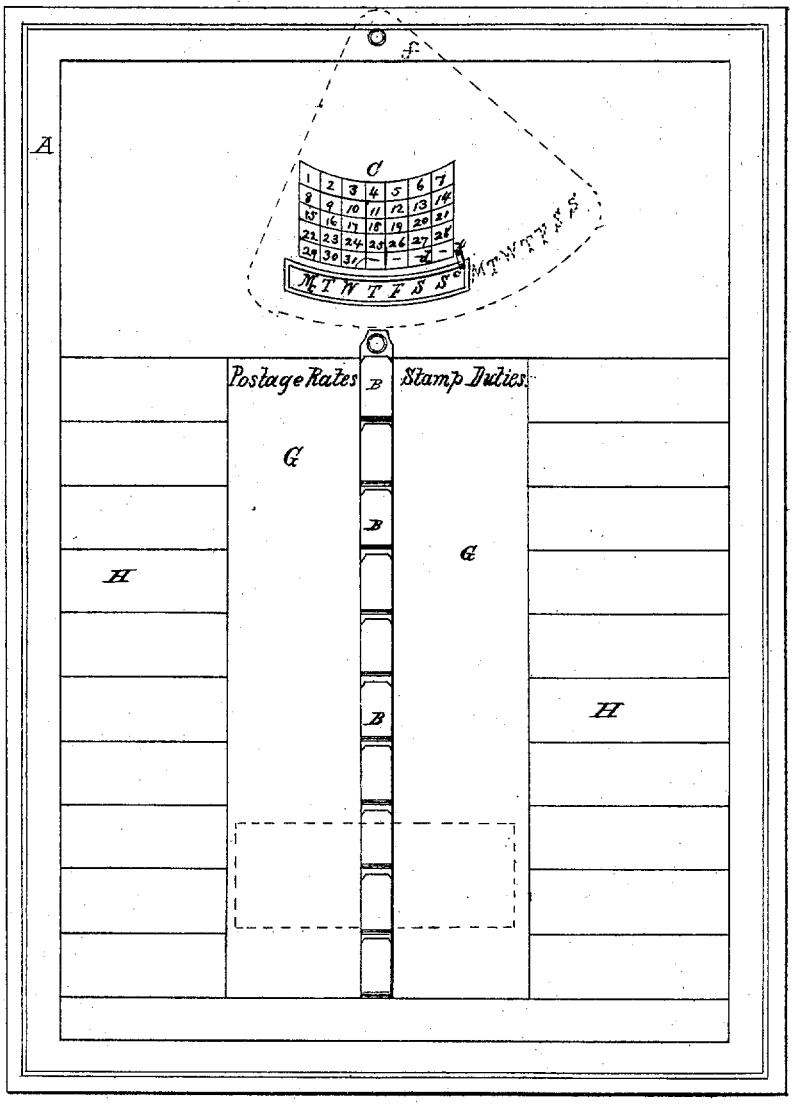
Figure 2:
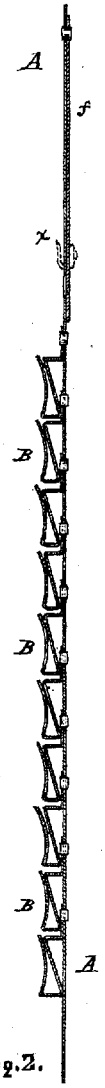

Figure 1 is a front view of my invention, and Fig. 2 a central vertical section of the same.

A is a piece of heavy card-board or binder's board properly bound and mounted, fitted to be hung or tacked up where it is desired to have a card-rack or calendar. B B, &c., are springs for holding loose cards, and are arranged in the present case in a single vertical line down the center of the card-board. There may, however, be more lines, or a different arrangement than that of vertical lines. These springs consist of a narrow piece of metal plate, bent in the shape shown in Fig. 2, and having a hole pierced through the shank at the top, by means of which they are secured to the card-board, each one separately, with eyelets. Near the top of the card-board is a perpetual calendar, C, constructed as follows: A table, *d*, of the days of the month, in numerals, is so arranged in columns that the several days of the month occurring upon the same days of the week, respectively, are in the same columns. Below this is a curved slot or aperture, *c*, cut through the card-board, while at the back of the card-board is a quadrant, *f*, pivoted to the card-board by an eyelet at the top, and held more closely at the slot by the fastener *x*; upon which quadrant is printed in succession the initial letters of the days of the week, so placed as to be visible through the slot.

To set the calendar for any month the quadrant is turned by means of the fastener *x* until the initial letters are brought, respectively, under the proper numerals. At each side of the line of springs are the spaces G G, one of which is headed "postage-rates," and the other "stamp-duties." These and other useful tables may be printed upon these spaces, or elsewhere upon the card-board. Outside of these spaces are columns H H for small advertising-cards, to be printed upon the card-board. I may also employ the space around the calendar for advertising purposes, with a display of large letters or engravings if desired.

By making the surface upon which the card-retaining springs are attached of paper or other like material susceptible of being printed upon, I am enabled to combine with the card-rack a variety of useful contrivances, as above set forth.

It will be observed that the perpetual calendar, which has been carefully devised for use in this combination, may be readily set for any month without moving the card-rack, and is also both compact and plain to read.

It will also be seen that the springs, by reason of their peculiar construction and independent attachment, being held to the card-board by the top of the said springs and operating independently of each other, will serve to hold the cards equally as well when secured to a flexible as to a rigid support.

What I claim as my invention, and desire to secure by Letters Patent, is—

1. The springs B, when constructed, arranged, and applied to the card-board A or other material susceptible of being eyeleted and of having the reference-tables G G, permanent cards H H, and calendar-numerals *d* printed upon it, substantially as and for the purposes specified and shown.

2. As a new article of office furniture, the pasteboard card A or its equivalent, provided with the card-retaining springs B and with the perpetual calendar C, consisting of the table *d*, slot *c*, and pivoted quadrant *f*, all constructed and arranged substantially as and for the purposes specified and shown.

L. CORYDON PRINDLE.

Witnesses:
F. F. WARNER,
N. C. GRIDLEY.